US012172216B2

(12) United States Patent
Chen et al.

(10) Patent No.: US 12,172,216 B2
(45) Date of Patent: Dec. 24, 2024

(54) METALLIC POWDERS AND METHODS THEREFOR

(71) Applicant: Wisconsin Alumni Research Foundation, Madison, WI (US)

(72) Inventors: Lianyi Chen, Madison, WI (US); Ali Nabaa, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 17/893,874

(22) Filed: Aug. 23, 2022

(65) Prior Publication Data

US 2024/0066593 A1 Feb. 29, 2024

(51) Int. Cl.
*B22F 9/08* (2006.01)
*B05B 7/16* (2006.01)

(52) U.S. Cl.
CPC .............. *B22F 9/082* (2013.01); *B05B 7/168* (2013.01); *B22F 2009/086* (2013.01); *B22F 2301/205* (2013.01)

(58) Field of Classification Search
CPC .............. B22F 9/082; B22F 2009/0824; B22F 2009/0828; B22F 2009/0832; B22F 2009/0836; B22F 2009/084; B22F 2009/0844; B22F 2009/0848; B22F 2009/0852; B22F 2009/0856; B22F 2009/086; B22F 2009/0864; B22F 2009/0868; B22F 2009/0872; B22F 2009/0876; B22F 2009/088; B22F 2009/0884; B22F 2009/0888; B22F 2009/0892; B22F 2009/0896
See application file for complete search history.

(56) References Cited

FOREIGN PATENT DOCUMENTS

| | | | |
|---|---|---|---|
| CN | 106378460 A | * | 2/2017 |
| CN | 110919014 A | * | 3/2020 |

OTHER PUBLICATIONS

Perez-de Leon et al. "Gas Atomization of Molten Metal: Part I. Numerical Modeling Conception" https://www.osti.gov/servlets/purl/1410811 (Year: 2016).*

Abu-Lebdeh et al. "Gas Atomization of Molten Metal: Part II. Applications" https://www.osti.gov/servlets/purl/1410812 (Year: 2016).*

Planche, et al., "Velocities of copper droplets in the De Laval atomization process, Powder Technology", vol. 229, 2012, pp. 191-198, ISSN 0032-5910,https://doi.org/10.1016/j.powtec.2012.06.031.

(Continued)

*Primary Examiner* — Alexandra M Moore
(74) *Attorney, Agent, or Firm* — Crawford Maunu PLLC

(57) ABSTRACT

Aspects of the disclosure are directed to methods and/or apparatuses involving the formation of pore-free or nearly pore-free liquid droplets. As may be implemented in accordance with one or more embodiments, liquid droplets including metal are formed having pores within the liquid droplets. This may involve, for example, atomizing liquid metal with a gas and forming the droplets having pores. The pores are then driven out of the liquid droplets by heating the liquid droplets from a first state in which an outer surface of the droplets has a lower temperature than an inner region thereof, to a second state in which the outer surface has a higher temperature than the inner region.

20 Claims, 3 Drawing Sheets

(56) References Cited

OTHER PUBLICATIONS

Jaques, A., "Thermophysical properties of argon", report, Feb. 1, 1988; Batavia, Illinois. (https://digital.library.unt.edu/ark:/67531/metadc1056231/: accessed Oct. 17, 2021), University of North Texas Libraries, UNT Digital Library, https://digital.library.unt.edu; crediting UNT Libraries Government Documents Department.
Macrossan, et al., "Viscosity of argon at temperatures >2000 K from measured shock thickness", Physics of Fluids 15, 3452-3457 (2003) https://doi.org/10.1063/1.1616556.
Gerling, R., et al., "Porosity and argon concentration in gas atomized γ-TiAl powder and hot isostatically pressed compacts", Materials Science and Engineering: A , vol. 252, Issue 2,1998, pp. 239-247, ISSN 0921-5093, https://doi.org/10.1016/S0921-5093(98)00656-X.
Whitaker, S., "Forced convection heat transfer correlations for flow in pipes, past flat plates, single cylinders, single spheres, and for flow in packed beds and tube bundles", Mar. 1972, AlchE J., 18: 361-371. https://doi.org/10.1002/aic.690180219.

* cited by examiner

METALLIC POWDERS AND METHODS THEREFOR

STATEMENT REGARDING FEDERALLY SPONSORED RESEARCH AND DEVELOPMENT

This invention was made with government support under 2011354 and 2002840 awarded by the National Science Foundation. The government has certain rights in the invention.

BACKGROUND

Pores in feedstock powders can transfer to parts made by additive manufacturing, which causes deterioration of part property and quality uncertainty. The manufacture of pore-free or nearly pore-free powders can be challenging, for example, due to the trapping of the pores in gas atomization processes. Pores in the feedstock powders can transfer to the parts made by additive manufacturing, which causes deterioration of part properties and quality uncertainty.

These and other matters have presented challenges to the manufacture and implementation of metallic powders, for a variety of applications.

SUMMARY

Various example embodiments are directed to apparatuses and methods involving the formation of liquid droplets and removal of pores therefrom, which may address various challenges including those noted above.

As may be implemented in accordance with one or more embodiments, liquid droplets including metal are formed having pores within the liquid droplets. The pores are then driven out of the liquid droplets by heating the liquid droplets from a first state in which an outer surface of the droplets has a lower temperature than an inner region thereof, to a second state in which the outer surface has a higher temperature than the inner region. The liquid droplets are then solidified. In connection with such aspects, it has been recognized/discovered that creating a temperature gradient in which an outer surface/region of liquid droplets, such as those formed via atomizing liquid metal, can drive pores toward the outer surface and out of the droplets.

Another embodiment is directed to an apparatus for manufacturing metallic powders, having a chamber, an atomizer and a heat source. The atomizer has an inlet to receive liquid metal and an outlet to atomize the liquid metal using a gas to form liquid droplets in the chamber. The liquid droplets have an outer surface and pores at an inner region within the liquid droplets. The heat source is configured to drive the pores out of the liquid droplets by heating the liquid droplets in the chamber from a first state in which the outer surface has a lower temperature than the inner region, to a second state in which the outer surface has a higher temperature than the inner region.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the accompanying drawings, in which.

Figure 1:
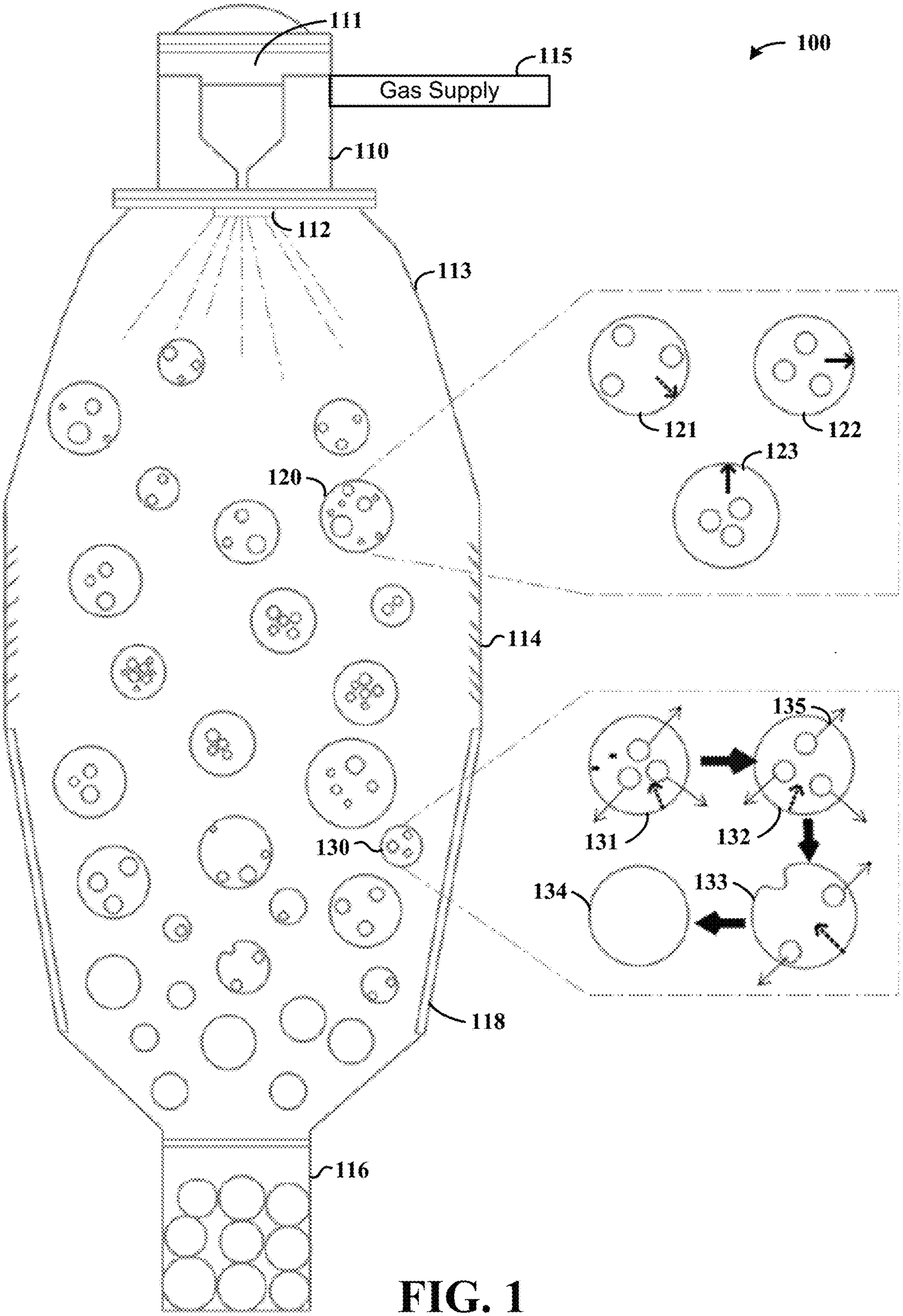
FIG. 1 shows an apparatus for forming powders from liquid droplets, in accordance with various embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as may be used throughout this application is by way of illustration, and not limitation.

DETAILED DESCRIPTION

Aspects of the present disclosure are believed to be applicable to a variety of different types of apparatuses, systems and methods involving the reduction or elimination of pores from metallic droplets, addressing challenges including those noted above. Specific applications are directed to the production of atomized powders with reduced porosity (pore-free or nearly pore-free) for additive manufacturing applications. A high temperature gradient may be created by heating the surface of molten droplets, reversing the temperature gradient within the droplets and therein facilitating migration of the pores to the surface of the droplets where the pores may dissipate. Accordingly, the following discussion characterizes various applications in this context, as may be implemented in accordance with one or more embodiments.

In accordance with a particular embodiment, a metal-based liquid droplet having an outer surface that is cooler than center is heated to reverse the droplet's temperature gradient, such that the outer surface becomes hotter than the center. This reversing of the temperature gradient is used to facilitate migration of pores within the droplet to the surface, and dissipation of the pores when they reach the surface. In connection with this aspect, it has thus been recognized/discovered that such reversal of the temperature gradient (e.g., via rapid heating as droplets pass through a chamber) can reduce or eliminate porosity in powders formed once the droplets are solidified. Further, the temperature gradient may be set based on the material, for instance to ensure the material is not boiled or that the composition of the material or structure of the material is not changed.

In some instances, droplets are formed by atomizing molten metal using a jet of gas such as an inert gas, and the atomized molten metal is passed through a nozzle. The droplets are rapidly heated, for example using a laser or plasma, to reverse a temperature gradient thereof such that a surface of the droplets is hotter than interior regions bearing pores. The pores are driven to the surface via this temperature gradient and removed from the droplets. Upon subsequent cooling, the droplets solidify inside the chamber and are collected, for instance to provide powder that may be useful for a variety of purposes, such as additive manufacturing, welding, soldering, and powder metallurgy.

As may be implemented in accordance with one or more embodiments, liquid droplets including metal are formed having pores therein. For instance, liquid metal may be atomized with a gas such as an inert gas, to form the droplets in a process that may introduce pores into the droplets. The pores are then driven out of the liquid droplets by heating the liquid droplets from a first state in which an outer surface of the droplets has a lower temperature than an inner region thereof, to a second state in which the outer surface has a higher temperature than the inner region.

In some instances, the droplets are formed with a liquid metal exhibiting a surface tension that decreases as a function of temperature, which may be used to facilitate migration of the pores. The heating may be carried rapidly (e.g., less than 20 milliseconds), and used to form a high temperature gradient (e.g., at least $5\times10^3$ K/m) from the outer surface to a center of the droplets. The liquid droplets may then be solidified, for example by allowing the droplets to cool as they fall (e.g., within a chamber). Such approaches may be used to form metallic powder.

In some instances, a rate of cooling of the droplets is controlled to mitigate the introduction and/or reintroduction of pores therein. This may be carried out before and/or after driving pores from the liquid droplets. For instance, heat may be applied to the liquid to facilitate cooling of the liquid droplets at a rate that is slower than a rate at which the liquid droplets would cool under ambient temperature. Such heat may be applied, for example, using a laser or plasma as noted above, or other heating elements (e.g., in or part of a chamber in which the droplets are cooled).

Another embodiment is directed to an apparatus for manufacturing metallic powders, having a chamber, an atomizer and a heat source. Other embodiments are directed to methods of using such an apparatus. The atomizer has an inlet to receive liquid metal and an outlet to atomize the liquid metal using a gas to form liquid droplets in the chamber. The liquid droplets have an outer surface and pores at an inner region within the liquid droplets. The heat source is configured to drive the pores out of the liquid droplets by heating the liquid droplets in the chamber from a first state in which the outer surface has a lower temperature than the inner region, to a second state in which the outer surface has a higher temperature than the inner region. Consistent with the above, the heat source may heat the liquid droplets from the first state to the second state in less than 20 milliseconds by generating a temperature gradient of at least $5\times10^3$ K/m, from the outer surface to a center of the droplets.

The atomizer may provide the liquid droplets in the first state upon atomization with the gas to form the liquid droplets having the pores therein (and the gas may introduce the pores in the liquid droplets). A gas supply may further supply the gas, for instance to a nozzle via which the liquid metal is passed and atomized by the gas. The gas supply may, for example, include a tube or other component that facilitates delivery of the gas, for example from a pressurized source. The gas delivery may be regulated using a gas regulator, valve, or other component. The apparatus may include a secondary heat source to control a rate of cooling of the liquid droplets after the pores have been driven therefrom.

In certain embodiments, the apparatus has a secondary heat source configured to control a rate of cooling of the liquid droplets after the pores have been driven therefrom. For instance, such a heat source may be located downstream (as the droplets fall) from the aforementioned heat source, and may control cooling of the liquid droplets until they solidify and drop to the bottom of the chamber to be collected. In some instances, the secondary heat source is part of the aforementioned heat source, which is operable to control heating to both drive out pores and mitigate reintroduction of pores.

The atomizer may be arranged at an upper portion of the chamber and configured to form the liquid droplets near the upper portion of the chamber, with the heat source located lower in the chamber to drive the pores out of the liquid droplets as they fall due to gravity. The height of the chamber may be chosen to facilitate (with the heat source) the formation of metallic powder by solidifying the liquid droplets while the droplets fall toward the lower portion of the chamber.

Turning now to the figures, FIG. 1 shows an apparatus 100 for forming liquid droplets, in accordance with another embodiment. The apparatus 100 includes an atomizer 110 having an inlet 111 via which liquid metal is received, and an outlet 112 via which the liquid metal may be atomized into a chamber 113 to form liquid droplets that may include pores. The apparatus 100 further includes a heat source 114 to heat the liquid droplets in the chamber 113 and therein drive the pores out of the droplets. The heat source 114 may utilize, for example, laser energy, plasma energy or other energy to generate heat. Atomization in this regard may be carried out using a gas such as an inert gas as may be supplied by a gas supply 115 and atomized within a nozzle within the outlet 112, which may introduce pores (e.g., that may include such a gas) in the droplets. The apparatus 100 may include an outlet/collection region 116 to collect the liquid droplets after they have been solidified within the chamber (e.g., to provide a powder)

In a specific example, the heat source 114 operates to apply heat to the droplets that is sufficient to reverse a temperature gradient therein. For example, where the liquid droplets are atomized into the chamber 113 with a core (center region) of the droplets having a temperature that is higher than a region near the surface of the liquid droplets, the heat source 114 may apply an intense heat that causes the surface of the liquid droplets to exhibit a temperature that is higher than that of the core.

Referring to liquid droplet 120 by way of example, formation thereof via the atomization may result in the introduction of pores as shown in the inset, in which pores (e.g., gas) are introduced near the surface of the droplet at 121 and migrate toward the core of the droplet as reflected at 122 and 123. The dark arrows in the inset show the temperature gradient at this stage, from high to low (with the core being of higher temperature and the surface to which the arrows point being relatively lower). Upon rapid heating by the heat source 114, the pores may be driven out. Referring to liquid droplet 130 and the inset thereof, pores exhibited at 131 are shown being driven toward the surface of the droplet at 132 and 133 in a direction as depicted by the arrows extending from the pores (e.g., as shown at 135). This is effected by reversing the temperature gradient as shown by the arrows initiating at the outer surface and directed toward the core of each depiction of the droplet 130. At 134, all pores have been driven out of the liquid droplet 130, with the progression of the pore removal taking place as the droplet passes downward through the chamber 113.

In some instances, the apparatus 100 also includes a component 118 that controls cooling of the droplets to facilitate the removal of pores therefrom. This component may include, for example, another heat source that applies heat in a manner that facilitates cooling of the liquid droplets but at a reduced rate, relative to a rate at which the pores would cool in ambient temperature within the chamber 113. In some implementations, the component 118 includes insulation that reduces the rate at which the pores cool (e.g., with or without the use of a heat source for this effect). Further, the length of component 118 may be set to facilitate controlled cooling of the droplets, for example by extending a distance via which the droplets fall before being collected.

Figure 2:
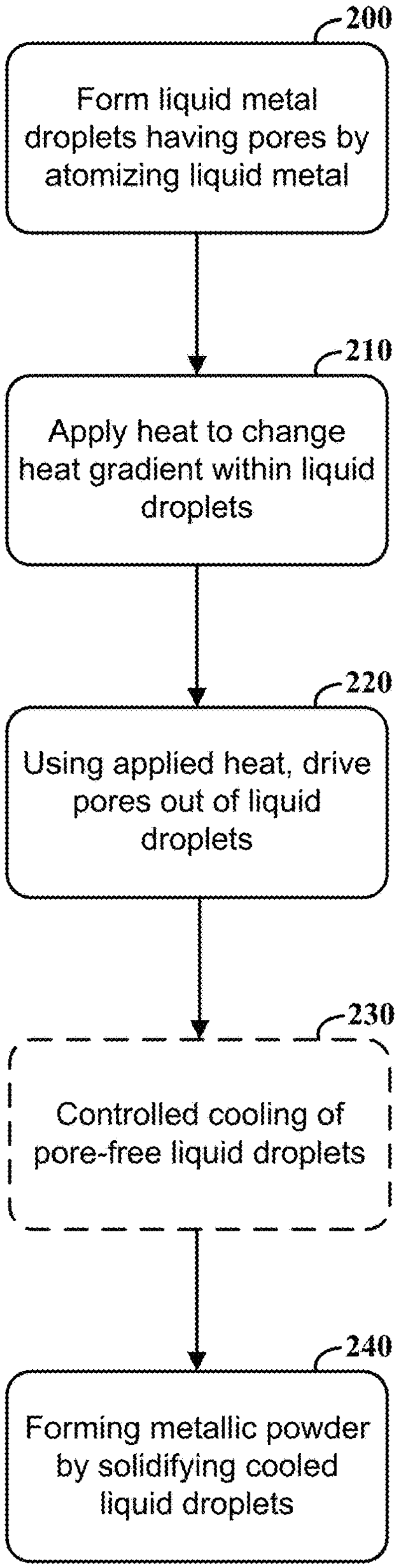
FIG. 2 shows an approach for forming powders from liquid droplets, in accordance one or more embodiments.

FIG. 2 shows a data flow diagram depicting an approach for removing pores from liquid droplets, as may be implemented in accordance with one or more embodiments. At block 200, liquid metal is atomized to form droplets having pores. This may involve, for example, atomizing liquid metal with an inert gas to form the droplets having a core temperature that is greater than a surface temperature thereof. At block 210, heat is applied to change the heat gradient within the liquid droplets, to place the droplets in a state in which a surface region thereof is higher in temperature than a core region. This applied heat is used at block 220 to drive pores out of the liquid droplets. For instance, as noted above it has been recognized/discovered that such a heat gradient when applied and held causes pores to migrate toward hotter regions of the droplets at the surface where the pores are eliminated (e.g., by movement to the surface and, as applicable, escape of gas).

Optionally, the (now pore-free) droplets may be cooled with a controlled cooling approach at block 230, such as by applying heat to slow the cooling process. At block 240, metallic powder is formed via solidification of cooled liquid droplets. The resulting powder may, for example, be used in additive manufacturing approaches, with the pore-free (or nearly pore-free) powder providing desirable structural characteristics.

Figure 3:
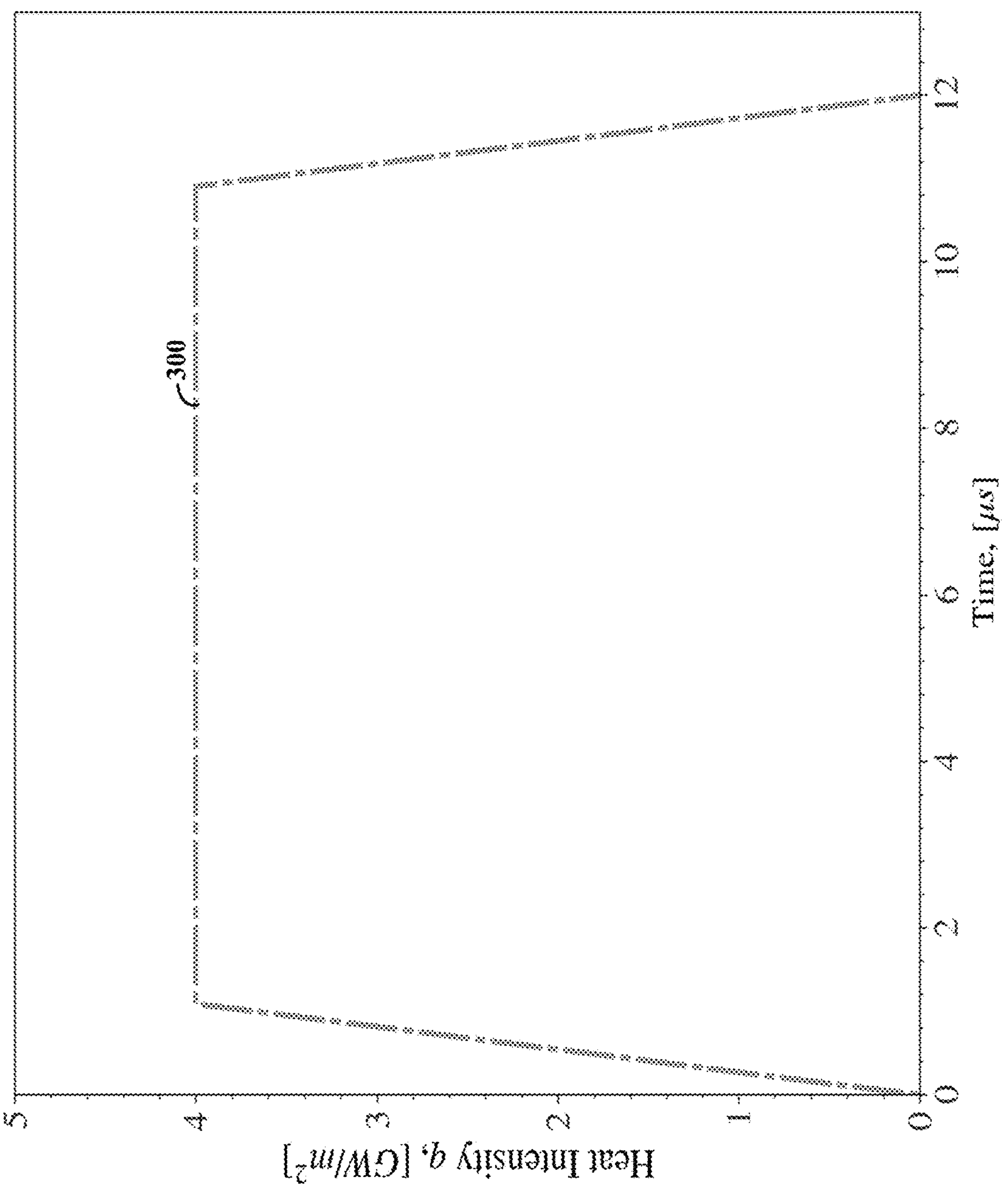
FIG. 3 shows a temperature gradient plot and approach driving pores from liquid droplets, in accordance one or more embodiments.

FIG. 3 shows a temperature gradient plot 300 and approach driving pores from liquid droplets, in accordance one or more embodiments. The plot 300 depicts an example heat intensity applied to pores along the vertical axis, and a time (in microseconds) during which the heat intensity is applied.

Such an approach as depicted in FIG. 3 may employ an atomization fluid of Argon at atmospheric pressure, in which pressure inside the pores $\hat{P}$ may be a function of the pressure around the droplet $P_0$, alloy surface tension at melting temperature γ, droplet diameter D and the pore diameter $d_p$, according to:

$$\hat{P}=P_0+2\gamma(2/D+2/d_p)$$

A velocity of falling droplets may be about 70 m/s, for instance for Ti-6A1-4V in which emissivity varies based on the surface condition, assumed in the context of this work to be ε=0.65. Due to the relatively small heat capacity of gas (e.g., Argon) inside the pores, the temperature of pores may be assumed to be equal to that of the droplet.

Based upon the above discussion and illustrations, those skilled in the art will readily recognize that various modifications and changes may be made to the various embodiments without strictly following the exemplary embodiments and applications illustrated and described herein. For example, additional heating and/or cooling cycles may be added to further drive pores out of liquid droplets. In addition, other processing conditions may be applied for manufacturing metallic powder. Such modifications do not depart from the scope of various aspects of the invention, including aspects set forth in the claims.

What is claimed is:

1. A method comprising:
- forming liquid droplets including metal, the liquid droplets having an outer surface and pores at an inner region within the liquid droplets;
- cooling the liquid droplets to a first state in which the outer surface has a lower temperature than the inner region; and
- driving the pores out of the liquid droplets by heating the liquid droplets from the first state to a second state in which the outer surface has a higher temperature than the inner region, therein reversing the temperature gradient within the droplets; and
- solidifying the liquid droplets.

2. The method of claim 1, wherein forming the liquid droplets includes atomizing molten metal to form the liquid droplets.

3. The method of claim 1, wherein solidifying the liquid droplets includes forming metallic powder by solidifying the liquid droplets after driving the pores out of the liquid droplets.

4. The method of claim 1, wherein solidifying the liquid droplets includes forming metallic powder by cooling and solidifying the liquid droplets after driving the pores out of the liquid droplets, including controlling a cooling rate of the liquid droplets.

5. The method of claim 1, wherein driving the pores out of the liquid droplets includes heating the liquid droplets from the first state to the second state in less than 20 milliseconds.

6. The method of claim 5, wherein heating the liquid droplets from the first state to the second state includes generating a temperature gradient of at least $5\times10^3$ K/m, from the outer surface to a center of the droplets.

7. The method of claim 1, wherein forming the liquid droplets includes atomizing molten metal with a gas to form the liquid droplets, therein introducing the pores in the droplets that include the gas trapped therein.

8. The method of claim 1, wherein forming the liquid droplets includes atomizing molten metal into a chamber.

9. The method of claim 1, wherein forming the liquid droplets includes forming droplets having a surface tension that decreases as a function of temperature.

10. The method of claim 1, after driving the pores out of the liquid droplets, further including inhibiting the formation of further pores in the liquid droplets by controlling a rate of cooling of the liquid droplets.

11. The method of claim 10, wherein controlling the rate of cooling of the liquid droplets includes applying heat to facilitate cooling of the liquid droplets at a rate that is slower than a rate at which the liquid droplets would cool under ambient temperature.

12. The method of claim 1, wherein:
- forming the liquid droplets includes atomizing liquid metal into the droplets, using an atomizer having an inlet to receive liquid metal and an outlet to atomize the liquid metal using a gas to form the liquid droplets in a chamber; and
- driving the pores out of the liquid droplets by heating the liquid droplets includes using a heat source to drive the pores out of the liquid droplets by heating the liquid droplets in the chamber from the first state to the second state.

13. An apparatus for manufacturing metallic powders, the apparatus comprising:
- a chamber;
- an atomizer having an inlet to receive liquid metal and an outlet to atomize the liquid metal using a gas to form liquid droplets including metal in the chamber, the liquid droplets having an outer surface and pores at an inner region within the liquid droplets, the chamber being configured to facilitate cooling of the liquid droplets, after atomization, to a first state in which the outer surface has a lower temperature than the inner region; and a heat source configured to drive the pores out of the liquid droplets by heating the liquid droplets in the chamber from the first state to a second state in which the outer surface has a higher temperature than the inner region, therein reversing the temperature gradient within the droplets, the chamber being configured to solidify the liquid droplets thereafter.

14. The apparatus of claim 13, wherein the atomizer is configured to provide the liquid droplets in the first state upon atomization with the gas, therein forming the liquid droplets having the pores therein.

15. The apparatus of claim 13, further including a gas supply to supply the gas.

16. The apparatus of claim 13, further including a secondary heat source configured to control a rate of cooling of the liquid droplets after the pores have been driven therefrom.

17. The apparatus of claim 13, wherein:

the atomizer is arranged at an upper portion of the chamber and configured to form the liquid droplets near the upper portion of the chamber;

the heat source is configured to drive the pores out of the liquid droplets as the liquid droplets fall, due to gravity, from the upper portion of the chamber to a lower portion of the chamber; and the chamber is configured with a height extending from the lower portion to the upper portion that facilitates, with the heat source, the formation of metallic powder by solidifying the liquid droplets while the droplets fall toward the lower portion of the chamber.

18. The apparatus of claim 13, wherein the heat source is configured to heat the liquid droplets from the first state to the second state in less than 20 milliseconds by generating a temperature gradient of at least $5\times10^3$ K/m, from the outer surface to a center of the droplets.

19. The apparatus of claim 13, wherein the atomizer is configured to introduce the pores in the droplets by trapping gas therein via the atomizing.

20. The apparatus of claim 13, wherein the heat source is configured to control a rate of cooling of the liquid droplets after driving the pores out of the liquid droplets, therein inhibiting the formation of further pores in the liquid droplets.

* * * * *